US011120507B2

(12) United States Patent
Naqvi

(10) Patent No.: US 11,120,507 B2
(45) Date of Patent: Sep. 14, 2021

(54) CONFIRMATION AND RATING OF USER GENERATED ACTIVITIES

(71) Applicant: Sensoriant, Inc., Cedar Knolls, NJ (US)

(72) Inventor: Shamim A. Naqvi, Morristown, NJ (US)

(73) Assignee: Sensoriant, Inc., Cedar Knolls, NJ (US)

( * ) Notice: Subject to any disclaimer, the term of this patent is extended or adjusted under 35 U.S.C. 154(b) by 844 days.

(21) Appl. No.: 15/488,083

(22) Filed: Apr. 14, 2017

(65) Prior Publication Data

US 2017/0301031 A1   Oct. 19, 2017

Related U.S. Application Data

(60) Provisional application No. 62/322,333, filed on Apr. 14, 2016.

(51) Int. Cl.
*G06Q 40/00* (2012.01)
*G06Q 40/08* (2012.01)
(Continued)

(52) U.S. Cl.
CPC ............. *G06Q 40/08* (2013.01); *G06Q 20/02* (2013.01); *G06Q 20/065* (2013.01)

(58) Field of Classification Search
CPC ...... G06Q 40/00; G06Q 401/08; G06Q 20/02; G06Q 20/065; G06Q 40/08
See application file for complete search history.

(56) References Cited

U.S. PATENT DOCUMENTS

2002/0186838 A1   12/2002   Brandys
2005/0114662 A1   5/2005   Meyer et al.
(Continued)

FOREIGN PATENT DOCUMENTS

WO   2016/083618 A1   6/2016

OTHER PUBLICATIONS

Public-key based access control in sensornet, Wang, Haodong; Sheng, Bo; Tan, Chiu C; Li, Qun. Wireless Networks; New York vol. 17, Iss. 5, (Jul. 2011): 1217-1234. (Year: 2011).*
(Continued)

*Primary Examiner* — Lalita M Hamilton
(74) *Attorney, Agent, or Firm* — Stuart H. Mayer; Mayer & Williams PC

(57) ABSTRACT

A method allows third party authentication of confirmation of an activity performed by a user of a computing device that receives first and second datasets of values for a plurality of attributes respectively obtained from a plurality of sensors associated with the computing device. The first and second datasets reflect a user activity obtained over first and second periods of time, respectively, during which the activity occurs. The computing device compares a subset of the attribute values in the first dataset to their corresponding attribute values in the second dataset to confirm whether they match to within a prescribed degree. If the matching is confirmed, a representation is created of an indicia of the confirmation and a set of cryptographic objects is derived from the representation such that a third party is able to authenticate the confirmation without being able to derive the first or second datasets.

15 Claims, 20 Drawing Sheets

| Step | Action |
|---|---|
| Provisioning | Service provider defines software logic (app) containing pre-determined confirmatory and rating attributes. User computing device downloads app. The app runs in two phases: template and instance. |
| 1 | User initiates template phase. |
| 2 | User follows instructions of template logic. |
| 3 | Template logic monitors user activity utilizing one or more sensors associated with user computing device. |
| 4 | User indicates to template logic that activity has ended. |
| 5 | Template logic processes sensor derived dataset creating representation. |
| 6 | Template logic signals service provider that template phase is completed. Receives acknowledgement of the same. |
| 7 | Service provider signals app logic that it may proceed with the next phase. |

(51) Int. Cl.
*G06Q 20/06* (2012.01)
*G06Q 20/02* (2012.01)

(56) References Cited

U.S. PATENT DOCUMENTS

| | | | |
|---|---|---|---|
| 2007/0185869 A1 | 8/2007 | Kirnak | |
| 2008/0228767 A1 | 9/2008 | Kenedy | |
| 2009/0063187 A1* | 3/2009 | Johnson | G16H 40/20 |
| | | | 705/2 |
| 2012/0131184 A1 | 5/2012 | Luna et al. | |
| 2012/0324231 A1 | 12/2012 | Camenisch | |
| 2013/0055367 A1 | 2/2013 | Kshirsagar | |
| 2013/0174244 A1 | 7/2013 | Taveau | |
| 2013/0218837 A1 | 8/2013 | Bhatnagar | |
| 2013/0290359 A1* | 10/2013 | Eronen | G06Q 30/0207 |
| | | | 707/758 |
| 2014/0085050 A1 | 3/2014 | Luna et al. | |
| 2014/0112470 A1 | 4/2014 | Shen | |
| 2014/0129826 A1 | 5/2014 | Mendelovich | |
| 2014/0287723 A1 | 9/2014 | LaFever et al. | |
| 2015/0058633 A1 | 2/2015 | Liu | |
| 2015/0288694 A1 | 10/2015 | Liebl | |
| 2015/0372814 A1 | 12/2015 | Ali et al. | |
| 2016/0094991 A1 | 3/2016 | Powell | |
| 2016/0127902 A1 | 5/2016 | Ciarniello | |
| 2016/0142380 A1 | 5/2016 | Fuller | |
| 2016/0210626 A1 | 7/2016 | Ortiz | |
| 2016/0213323 A1* | 7/2016 | Proud | A61B 5/6889 |
| 2016/0328713 A1 | 11/2016 | Ebrahimi | |
| 2016/0381003 A1 | 12/2016 | Caceres | |
| 2017/0019255 A1 | 1/2017 | Kamakari et al. | |
| 2017/0076618 A1* | 3/2017 | Smith | G09B 5/02 |
| 2017/0301031 A1 | 10/2017 | Naqvi | |
| 2018/0026796 A1 | 1/2018 | Oberheide | |
| 2018/0144114 A1 | 5/2018 | Fiske | |
| 2018/0211718 A1* | 7/2018 | Heath | G16H 10/65 |
| 2018/0262493 A1 | 9/2018 | Andrade | |
| 2019/0295307 A1* | 9/2019 | Chamdani | G06T 13/40 |

OTHER PUBLICATIONS

Chen et al. Sensor-Based Activity Recognition. 2012. [retrieved on Apr. 5, 2018). Retrieved from 1-16 the Internet:<URL:http://ieeexplore.ieee.org/stamp/stamp.jsp?tp=&arnumber=6208895>. entire document.

Sasson et al., "SNARKs for C: Verifying Program Executions Succinctly and in Zero Knowledge" 53 pages, Oct. 7, 2013.

* cited by examiner

| Step | Action |
|---|---|
| Provisioning | Service provider defines software logic (app) containing pre-determined confirmatory and rating attributes. User computing device downloads app. The app runs in two phases: template and instance. |
| 1 | User initiates template phase. |
| 2 | User follows instructions of template logic. |
| 3 | Template logic monitors user activity utilizing one or more sensors associated with user computing device. |
| 4 | User indicates to template logic that activity has ended. |
| 5 | Template logic processes sensor derived dataset creating representation. |
| 6 | Template logic signals service provider that template phase is completed. Receives acknowledgement of the same. |
| 7 | Service provider signals app logic that it may proceed with the next phase. |

FIG. 1A

| Step | Action |
|---|---|
| 1 | User launches the instance phase of the app logic. |
| 2 | User initiates his activity. |
| 3 | Instance logic monitors user's activity, gathers activity data and adds it to the template dataset of phase 1. User may optionally follow in-progress instructions rendered on user computing device. |
| 4 | User indicates to Activity Instance logic that activity has ended. |
| 5 | Activity Instance logic processes the instance activity dataset and creates a dataset containing data from both the template and instance phases. |
| 6 | App logic informs service provider that it has created a dataset. Execution of app logic comes to an end. |

FIG. 1B

| Activity-Walk | Heart-rate | Location | Time |
|---|---|---|---|
| Start | 70 | [43.56, 67.89] | 0 minutes |
| Intermediate | 90 | [67.76, 92.43] | 15 minutes |
| End | 100 | [89.92, 97.01] | 30 minutes |

FIG. 2B

| Activity-Walk | Heart-rate | Location | Time |
|---|---|---|---|
| Start | 67 | [34.56, 62.89] | 0 minutes |
| Intermediate | 95 | [63.90, 96.45] | 15 minutes |
| End | 120 | [83.08, 92.87] | 35 minutes |

Note: The intermediate point may be chosen to coincide with an elapsed time of 15 minutes from the start of the activity.

FIG. 2C

| Activity-Walk | Heart-rate | | Location | Time | |
|---|---|---|---|---|---|
| Start | 70 | 67 | [43.56, 67.89] | [34.56, 62.89] | 0 minutes | 0 minutes |
| Intermediate | 90 | 95 | [67.76, 92.43] | [63.90, 96.45] | 15 minutes | 15 minutes |
| End | 100 | 120 | [89.92, 97.01] | [83.08, 92.87] | 30 minutes | 35 minutes |

FIG. 2D

Confirmatory attributes = [Heart-rate, location, time]
Confirmation specification: [

Heart-rate average must exceed average value by 10 points or more;
    Location must be within +/- 500 yards of starting, intermediate and end locations;
    Duration of activity must be > 30 minutes]

Rating attribute: [average heart-rate ]
Specification: [    instance heart-rate average – template heart-rate average <= 10 [fair]
                between 10 and 20 [good]
                between 20 and 30 = [very good]
                exceeds 30 = [excellent]]

FIG. 2E

| Activity-Walk | Heart-rate | | Location | | Time | |
|---|---|---|---|---|---|---|
| Start | 70 | 67 | Center [43.56, 67.89] | Point [34.56, 62.89] | Point within 500 yard circle = yes | 0 minutes | 0 minutes |
| Intermediate | 90 | 95 | Center [67.76, 92.43] | Point [63.90, 96.45] | Point within 500 yard circle = no | 15 minutes | 15 minutes |
| End | 100 | 120 | Center [89.92, 97.01] | Point [83.08, 92.87] | Point within 500 yard circle = yes | 30 minutes | 35 minutes |
| | Average = 86.6 | Average = 94 | 500 yard circle with indicated center | | | Duration = 30 minutes | Duration = 35 minutes |

FIG. 2F

| 70 | 67 | 43, 67 | 34, 62 | 0 | |
|---|---|---|---|---|---|
| 90 | 95 | 67, 92 | 63, 96 | 15 | |
| 100 | 120 | 89, 97 | 83, 92 | 30 | |
| | | | | | |

FIG. 4A

| 70 | 67 | 43 | 67 | 34 | 62 | 0 |
|---|---|---|---|---|---|---|
| 90 | 95 | 67 | 92 | 63 | 96 | 15 |
| 100 | 120 | 89 | 97 | 83 | 92 | 30 |

FIG. 4B

| 70 | 67 | 43 | 67 | 34 | 62 | 0 | 0 |
|---|---|---|---|---|---|---|---|
| 90 | 95 | 67 | 92 | 63 | 96 | 15 | 15 |
| 100 | 120 | 89 | 97 | 83 | 92 | 30 | 35 |
| x11 | x12 | x13 | x14 | x15 | x16 | x17 | x18 |
| x21 | x22 | x23 | x24 | x25 | x26 | x27 | x28 |
| x31 | x32 | x33 | x34 | x35 | x36 | x37 | x38 |
| x41 | x42 | x43 | x44 | x45 | x46 | x47 | x48 |
| x51 | x52 | x53 | x54 | x55 | x56 | x57 | x58 |

Note: x11, x12, ..., x58 are random integral values.

FIG. 4C

|   |   |   |
|---|---|---|
| 1 | 2 | 3 |
| 3 | 1 | 2 |
| 2 | 3 | 1 |

Sudoku constraints

FIG. 6C

Proving Key = Encryption Key = sequence of hexadecimal characters

Verifying key = Decryption Key = sequence of hexadecimal characters

FIG. 6D

```
i,37     -> 1
ii,42    -> 2
iii,64   -> 3
iv,31    -> 1
v,48     -> 2
vi,34    -> 3
vii,36   -> 1
viii,47  -> 2
ix,33    -> 3
```

FIG. 6B

|   |   |   |
|---|---|---|
| 37 i | 42 ii | 64 iii |
| 31 iv | 48 v | 34 vi |
| 36 vii | 47 viii | 33 ix |

Activity Specification constraints

Constraint = sum of each row and column is equal.

FIG. 7B

Legend:
"_" missing cell value

1. Decrypt "proof" to get one component of Puzzle, i.e., FIG. 7A and the constraints using the decryption key.

Combine output dataset "R2" from FIG. 7B with above decrypted component to get completed object (Sudoku).

Verify constraints are satisfied.

If yes, return "true"; else return "false".

FIG. 8

CONFIRMATION AND RATING OF USER GENERATED ACTIVITIES

CROSS-REFERENCE TO RELATED APPLICATIONS

This application is a Non-Provisional of Provisional Application No. 62/322,333, filed Apr. 14, 2016, entitled "A System and Method for Encapsulating Activities and Agreements as Verifiable Transactions" and is related to U.S. application Ser. No. 15/475,748, filed Mar. 31, 2017, entitled "SYSTEM AND METHODS FOR SHARING AND TRADING USER DATA AND PREFERENCES BETWEEN COMPUTER PROGRAMS AND OTHER ENTITIES WHILE PRESERVING USER PRIVACY", both of which are incorporated herein by reference in their entirety.

BACKGROUND OF INVENTION

Many people engage in physical activities for health, work and pleasure. Many employment tasks involve physical activities. The proliferation of mobile devices containing sensors in social life and the workplace is growing. Such devices can monitor their immediate environments and process the data (or transmit it to more powerful server machines for processing).

SUMMARY OF INVENTION

In accordance with one aspect of the disclosed subject matter, a method is provided for allowing third party authentication of confirmation of an activity performed by a user of a computing device. In accordance with the method, a computing device receives a first dataset of values for a plurality of attributes respectively obtained from a plurality of sensors associated with the computing device. The first dataset reflects an activity of the user obtained over a first period of time during which the activity occurs. The computing device also receives a second dataset of values for the plurality of attributes respectively obtained from the plurality of sensors that reflect the activity of the user obtained over a second period of time during which the activity occurs. The first dataset is a reference dataset to which the second dataset is to be compared. The computing device compares at least a subset of the attribute values in the first dataset to their corresponding attribute values in the second dataset to confirm whether at least the subset of attributes values in the second dataset matches the subset of attribute values in the first dataset to within a prescribed degree. If the matching is confirmed, a representation is created of an indicia of the confirmation and a set of cryptographic objects is derived from the representation such that a third party is able to authenticate the confirmation of the matching without being able to derive the first or second datasets.

In accordance with another aspect of the disclosed subject matter, a method is provided for third party authentication of a confirmation of an occurrence of an activity performed by a user of a computing device. In accordance with the method, activity data is received obtained from one or more sensors associated with the user computing device. The computing device is used to confirm and rate occurrence of the activity. The computing device is also used to derive a representation of the occurrence of the activity. The representation is designed to authenticate the confirmation and the rating to a third party when the third party is provided with the representation and cryptographic objects generated by the computing device. The activity data is unable to be derived from the representation and the cryptographic objects. The representation and the cryptographic objects are provided to the third party to authenticate the confirmation and rating.

BRIEF DESCRIPTION OF DRAWINGS

FIG. 1A shows a series of steps that describes one example of a first phase of method for confirmation and rating of user generated activities.

FIG. 1B shows a series of steps that describes one example of a second phase of a method for confirmation and rating of user generated activities.

FIG. 2B shows an exemplary dataset for the template phase of the activity.

FIG. 2C shows an exemplary dataset of the instance phase of the activity.

FIG. 2D shows the combined dataset of the activity.

FIG. 2E shows exemplary specification constraints that may be used to confirm/disconfirm and rate events.

FIG. 2F shows an exemplary dataset with specification information.

FIG. 4A shows a dataset created from the combined dataset of an activity.

FIG. 4B shows the dataset of FIG. 4A being converted into an 8×3 matrix (dataset).

FIG. 4C shows the dataset of FIG. 4B being converted into an 8×8 matrix (dataset).

FIGS. 6A, 6B, 6C and 6D show an exemplary operation of converting a user dataset into a representation.

FIG. 7A shows an exemplary proof object.

FIG. 7B shows an exemplary representation.

FIG. 8 shows the method by which PVE may be used to confirm an activity or event.

DETAILED DESCRIPTION

Figure 2A:
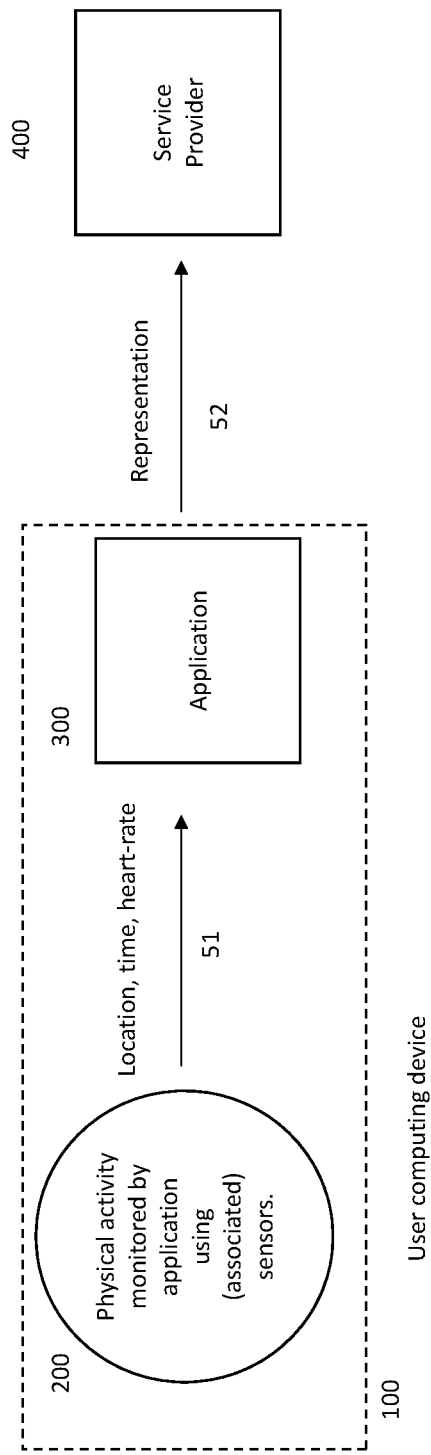
FIG. 2A shows an example of an activity being monitored by a user computing device.

Many people engage in physical activities and health care professionals advocate their benefits. Subscriptions and memberships to health clubs are increasing and many enterprises provide sophisticated exercise equipment for home and professional use. Such machinery typically have various sensors that monitor various attributes of the users such as temperature, heart rate, weight, etc.

The use of user computing devices is also growing and many people always carry mobile computing devices (e.g., smartphones) with them. Such mobile computing devices may contain sensors that can monitor the user and the environment and the data so obtained may be processed by applications running on the mobile device or by servers in network connection with the mobile computing device(s).

Thus, the ability of user computing devices to monitor the activities of users is increasing rapidly and this has caused concern in the user community. In particular, users prefer not to share their personal data, including exercise and other activity related data with third parties. User privacy concerns are paramount and need to be observed by service providers.

In one aspect, the subject matter described herein concerns the encapsulation of various physical activities, including exercise related activities, into one or more datasets, i.e., user activity datasets, from which representations may be derived. The raw data obtained as a result of the activity (as gleaned by sensors associated with a user computing device) is considered as private data that is not to be shared with a third party. We seek to derive representations of the raw activity dataset, the representations having certain properties. In particular, the representations are such that they may be processed by third parties as discussed below.

Whereas a user's activity dataset is preferably kept private and not shared with a third party, users may wish to get confirmation that they are in fact performing the activity itself. For example, a user may wish to demonstrate to his health insurance company that he is performing certain exercise related activities so that his cost of insurance could be lowered. Several insurance carriers advertise preferential health insurance rates for customers who engage in regular physical exercise.

The question then becomes how to share data with a third party like an insurance company without revealing the activity dataset of the user. We propose a solution as follows.

A third party provides software logic, an application ("app") to a user computing device, e.g., the computing device may download the app. The raw activity dataset gathered by the user computing device is processed by the app in the device's (local) environment. In particular, the dataset may be processed and the logic of the app may determine that the data is indicative that the activity took place.

Thus, if the user's activity relates to him taking a walk the logic may be able to ascertain from sensor data that the walking event or activity occurred. We refer to this as the app confirming the event. The app may further rate the event with respect to certain criteria (discussed later).

It is important to note that confirmation and rating of the activity or event (based on the analysis of the activity dataset) is carried out by the app running on the user computing device. Once the confirmation and rating has been done, the app may be used to generate a representation of the activity dataset that, in turn, may be sent to a third party.

A third party receiving a representation of a confirmed (and possibly rated) event may use certain tools (as described below) to verify that the received representation was generated by software logic that was provided by the third party itself or a trusted third party. Further, the third party is able to ensure that the logic used to generate the representation has not been tampered with. Thus, the third party may trust that the representation was generated by a trusted logic. In this sense, the third party may trust that an event such as "walk" occurred and trust the rating assigned to it by the app logic.

That is, the third party may trust the conclusions of the application logic (provided by him or a trusted party), particularly if it can be ascertained that the logic has not been altered or changed in any way.

The representations generated by the app logic have the properties that 1) they cannot be reverse engineered to yield the underlying user data, 2) they may be used to verify that the representations are authentic in the sense described above, and 3) they may be used to confirm the occurrence of the event indicated by the representation, i.e., the event in question did occur, again in the sense described above.

The invention presupposes that the user computing device and its associated storage are deemed private and under user control. Since the user data is gathered by the device and is never transmitted to any external agency, the user data may be assumed to be kept private.

As mentioned, a confirmed event may also be rated by the app logic. In one sense the rating of an event is a measure based on parameters characterizing the event. For example, consider the event "walk for 2 miles with a heart rate exceeding 120". Here the parameters considered by the app logic may be the distance (2 miles) and the heart rate (greater than 120). A "good" rating may then represent an event in which the distance exceeds 2 miles and the heart rate parameter exceeds the threshold by e.g., 10%.

Advantageously, a service provider (who may or may not be the service provider that provides the app) may construct a template for an activity, say walk, and define certain attributes that the activity may possess. For example, a walk template may be defined to possess the attributes starting point, ending point, distance, heart rate, time of walk, speed of walking, etc.

One or more of these attributes may be specified by the service provider as "confirmatory", i.e., these attributes must be present in an activity for it to be confirmed (as an event having occurred).

One or more of the confirmatory attributes may be used in the rating of events.

Thus, the general paradigm for one embodiment may now be stated as follows. Service providers define activity templates using special software logic, e.g., applications or apps, which may be acquired, e.g., downloaded, into user computing devices. A user may engage in an activity recorded by his computing device (and the sensors associated with the device). The ensuing activity dataset may then be processed locally (in the computing device) as confirming certain criteria characteristic of an event. The app logic may also rate an event. Activity datasets may be processed to create representations that may then be shared with third parties that, using tools described herein, may assure themselves of the authenticity of the confirmation and rating.

In one embodiment, the confirmatory and rating attributes (and their corresponding values) are specified by service providers or by third parties. In another embodiment, the confirmatory and rating attributes (and their corresponding values) may be specified by the user himself. The user's activity, the confirmatory and rating criteria may be encapsulated as an agreement between one or more parties. In one embodiment, the agreement is implemented as a smart contract in a block chain ledger system.

In one embodiment in which the confirmatory and rating attributes are specified by a third party, the user engaging in the activity is unaware of the confirmatory and rating attributes, i.e., the attributes are "hidden" from the user.

General Method

A user computing device contains one or more processors, one or more network interfaces and incorporates or is in communication with one or more sensors that sense various environmental indicia such as Geo-Positioning Satellite (GPS) signals, temperature, heart-rate, motion, proximity, etc.

Illustrative examples of user computing device include, without limitation, mobile communication devices (e.g., cellular phones, smart phones), personal computers, laptops, tablet computers, smart watch, wearable computers (e.g., fitness bands), personal digital assistants (PDAs), wearable medical devices such as smart bandages and the like which have sensors that generate physiological data and devices and systems in which such user computing devices are embedded or otherwise incorporated.

A user computing device is provisioned by a service provider with application logic (i.e., an app). Data from any of a variety sensors is made available to the app as it runs on the user computing device. The sensor data may originate from sensor devices installed in a geographical environment that wirelessly communicate with the user computing device, such as temperature and pressure sensors.

The sensor data also may originate from machines and smart devices that contain sensor devices, e.g., smart phones typically contain several different sensors, e.g., accelerometer, GPS-based location sensor, etc. Likewise, exercise machines contain sensor devices. In some cases, software logic executing within a smart device or smart phone produces sensor data. In other examples, smart devices may be near a smart phone or other computing device and the smart devices may transmit data to the smart phone, from whence it may be further transmitted to one or more server machines. Such proximate sensor/devices are also referred to as associated devices. As a final example, a user may be wearing one or more smart devices that obtain data related to the user's health. Data may be directly sent to a server or may be transmitted to a mobile device of the user. The mobile device may process the data or may transmit all or some of the data to one or more server machines for further processing.

In one embodiment, the app logic runs in two phases: a template phase (FIG. 1A) and an instance phase (FIG. 1B).

In a provisioning step, the user computing device receives and installs the application logic from a service provider.

In step 1, the template phase is initiated; it instructs the user (step 2) to begin the indicated activity.

In step 3, the logic of the activity template monitors the activity and collects sensor data obtained from the user computing device.

In step 4, the user indicates to the app logic that the activity has come to an end.

In step 5, the app logic processes the sensor data obtained from the recently concluded activity and creates a dataset whose details are provided later.

In step 6, the app logic signals to the service provider that the template phase has concluded and receives acknowledgement. (The address of the service provider may be pre-provisioned in the app logic.)

In step 7, the service provider signals the app logic that it may proceed with the next phase of the method.

We now describe the instance phase of the app logic.

In step 1, the user initiates the instance phase of the app logic.

In step 2, the user starts his activity, e.g., starts walking.

In step 3, the app logic monitors the activity of the user utilizing the (associated) sensors of the user computing device and collects sensor data. The logic may render "in-progress" communications that may be followed by the user. Details of the "in-progress" communications are provided later.

In step 4, the user indicates that his activity has ended.

In step 5, activity logic processes the sensor data received during the activity and combines it with the previously obtained data from the template phase to derive a combined dataset.

Note that the combined activity dataset is stored locally in the user computing device and is not transmitted to a third party.

In step 6, the app logic concludes its execution.

Exemplary Activity

In one example, a user is provided with an application/app from a service provider related to the activity of "walking". The logic operates in two phases: a template and an instance phase. When the user launches the template phase on his computing device, he is asked to begin his activity to create a template, i.e., begin his walk.

As the user walks, the logic uses the various sensors of the user computing device, including any associated sensors (e.g., the user may be wearing a smart watch that is in wireless connection with his smart phone) to monitor the on-going activity and collect data from the sensors as per the confirmatory attributes pre-determined in the logic.

For example, the confirmatory attributes may be heart-rate, position and time (from the start of the walk) of the user.

FIG. 2A depicts the situation. User computing device 100 monitors the user's activity via sensors 200 of the user computing device, obtains heart-rate, location and time data and transmits (51) them to the application 300.

At the conclusion of his activity, the user signals to the logic that the activity has ended and the logic indicates it is ready for the user to initiate an "instance" walk at the convenience of the user.

Subsequently, the user launches the instance phase and begins his walk. In-progress communications may be rendered by the instance logic on the user computing device and the user may follow the instructions therein. The user computing device gathers sensor data as before. At the conclusion of the (instance) walk, the computing device collects sensor data from both phases of the walk and organizes it into a dataset, processes the dataset and stores the dataset locally and transmits a signal to the service provider (400) that it has created a dataset.

FIG. 2B shows an exemplary dataset obtained by the app logic during the activity phase. Note that the pre-determined confirmatory attributes are heart-rate, location, and time (duration of walk). The rating attribute is "heart-rate". As stated above, the service provider may choose these attributes and provision the service logic accordingly.

FIG. 2C shows the exemplary dataset obtained by the app logic during the instance phase.

FIG. 2D shows a combination of the two datasets.

Confirming Events from Datasets

The activity template may be thought of as a "bench-mark" or reference against which future instances can be measured. As described above, the bench-mark or reference is provided by the user himself. In other embodiments, a service provider or a third party, e.g., a coach or fitness consultant, may specify the bench-mark or reference template.

It was stated earlier that the app logic provided by the service provider contains specifications related to the confirmatory and rating attributes. FIG. 2E shows an example of such a specification that are meant to state the following conditions. In the example of FIG. 2E, we want to compare a walk instance against the bench-mark using the average heart rate, the proximity of the start, intermediate and ending locations of the two sets of walks and the corresponding durations. Thus, we want the average heart rate of the instance to exceed the average bench-mark heart-rate by at least e.g., 10 points, the starting, intermediate and ending locations of the instance to be within e.g., 500 yards of the template, and, finally, the duration of the instance to be e.g., at least 30 minutes.

In FIG. 2F we show an exemplary calculation of the confirmatory attributes.

The average heart-rate for the walk activity template is calculated and shown as average=86.6; the average value of the corresponding walk instance is 94. The duration of the template and the instance are 30 and 35 minutes respectively.

The calculation of the location attribute requires a fuller explanation. As is well-known in prior art, a geo-location may be used as a center of a geo-circle of a given radius. Thus, using the GPS coordinates [43.56, 67.89] as the center by way of example, we may define a geo-circle of radius 500 yards. Now, given a point, say [34.56, 62.89], we may determine if the latter lies in the geo-circle. Such calculations are well-known.

FIG. 2F shows the result of exemplary calculations of the location attribute. The template location value is used as the center of a geo-circle with radius 500 yards and the instance value of the location attribute is determined to lie within the circle (or not). The exemplary results are shown in FIG. 2F. Note that the location of the intermediate point does not fall within the indicated geo-circle.

The app logic provided by the service provider may be configured to perform the above calculations and act accordingly. In particular, the logic may be configured to confirm or disconfirm confirmation if one or more specification conditions are violated. Thus, since the intermediate location in the example above fails to lie within the required 500-yard limit, the logic may be configured to disconfirm the event. Alternatively, the logic may be configured to disregard one or more violations and proceed with a confirmation.

Rating Events

Next, we consider the rating function that in some embodiments may be performed by the app logic.

A confirmed event may be rated using the rating specification. In our exemplary rating specification shown in FIG. 2E, the ratings are based on the values of the average heart-rate. As FIG. 2F shows, the exemplary "walk" dataset shows that the walk instance had an average heart-rate value of 94 compared to the template's average value of 86.6. Thus, for this example, the rating specification dictates that the logic assign a "fair" rating to the walk instance since the difference is less than 10.

It may be desirable that the level of physical activity, particularly as it relates to activities associated with exercise for reasons of health, be gradually increased. The rating of events can assist in this process by requiring that the rating formula be based on numeric values rather than descriptors as in the examples above. We may then periodically vary the ratings by considering a weighted average over a given number of activities, say 1-months' worth of activities. An exemplary formula would be New rating=Old rating*(total duration of user's last 20 activities÷total time of last 20 activities of all users)

(We assume that the above expression is computed over the same given activity, e.g., the walk activity.)

Thus, ratings may be reduced over time and thereby provide implicit incentive for users to achieve higher levels of physical activity.

Rendering in-Progress Activities

Consider, by way of example, a user engaged in an instance of a walk after he has created a walk template in which the confirmatory attribute is "location". In one embodiment, the app logic renders the instantaneous location of the user on his computing device as follows.

We use the template dataset to render the path of the user and super-impose his instantaneous path to show the difference between the two paths.

Figure 3A:
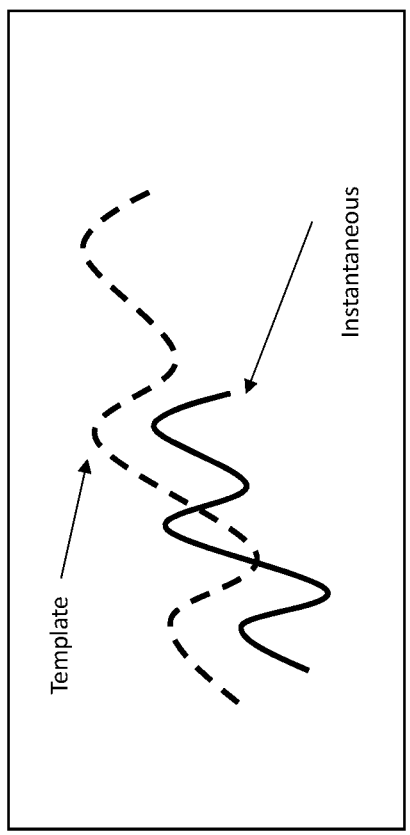
FIG. 3A shows a rendering of an exemplary walking activity that may be presented to the user.

One such example is shown in FIG. 3A. The dashed line shows the path of the user (a series of locations traversed during the walk) during the template phase. The solid line shows the path traversed by the user while the walk is in progress (instance phase).

One utility of such a rendering could be to "guide" the user to manage his activity to conform to the template more closely. By making changes to his activity, the user in the walk example, may make his template and instantaneous paths to be coincident.

Figure 3C:
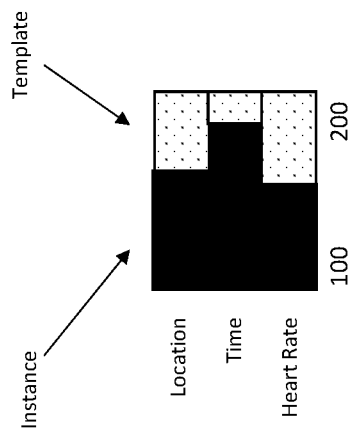
FIG. 3C shows an alternative rendering of an activity involving three attributes.
Figure 3B:
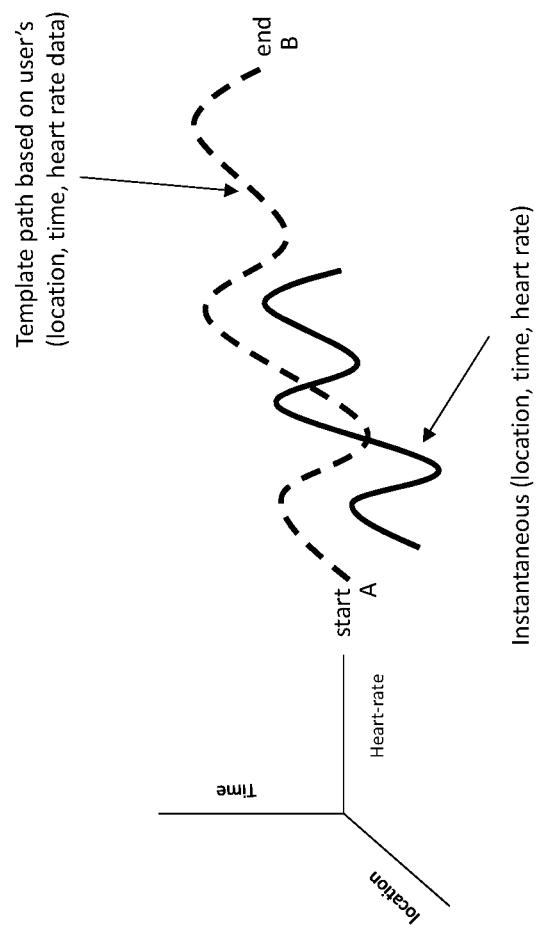
FIG. 3B shows an exemplary rendering of an activity involving three attributes.

If more than one parameter is considered for a rendering, we may choose a coordinate system to render an on-going activity. FIG. 3B shows an exemplary rendering using a three-dimensional coordinate system (location, time and heart-rate) to show the template path (dashed curve) and the instantaneous path (solid curve) of the user.

In cases where more than 3 parameters are considered for a rendering, a coordinate system based rendering approach may become too confusing for a user. We may need to choose a different rendering scheme. One such example is shown in FIG. 3C. The solid rectangles represent the instantaneous values of the parameters and the "dotted" background rectangles show the template datasets. Again, as the user alters various aspects of his activity, the instantaneous rectangles change to reflect the efficacy of his alterations.

A user may glance at the rendering on his computing device and alter various aspects of his activity, while in progress, to make it better conform to his template.

It is to be noted that in one embodiment the service provider may choose the attributes to be monitored for a given activity and also choose the confirmatory and rating attributes. Generally, the confirmatory attributes are a subset of the attributes chosen for the activity and the ratings attributes are a subset of the confirmatory attributes. In set theoretic terms, ratings attribute set 532 confirmatory attribute set 532 "set of all chosen attributes" for a given activity.

A rendering corresponding to an in-progress activity may use one, more than one or none of the confirmatory attributes chosen for that activity.

Converting Activity Datasets into Processed (Activity) Datasets

In the description so far, we have shown how to encapsulate a user's activity into a dataset such as shown in FIG. 2D. We may then use custom service logic to ascertain that the activity dataset satisfies a given specification, e.g., FIG. 2E. The custom logic may then produce a dataset such as that shown in FIG. 2F indicative of a confirmation; otherwise it may produce an empty dataset or some such special symbol indicative of disconfirmation.

We may convert the attribute values of FIG. 2D into the dataset shown in FIG. 4A by disregarding the column and row labels and the decimal fractions. By re-arranging the comma-separated values into their own columns we may derive the dataset shown in FIG. 4B.

Next, we add rows (and/or columns) to convert the above derived dataset into a square matrix. For example, the matrix of FIG. 4B yields the 8×8 matrix shown in FIG. 4C.

We refer to the dataset derived from the user's raw activity dataset (FIG. 2D) as the processed activity dataset (FIG. 4C).

Note that a user's processed activity dataset is a matrix of numerical integral values whose order, i.e., number of rows and columns, may be pre-determined by the service provider. The integral values are derived from various attributes related to a given activity of the user (both template and instance data).

We note that the above described method of converting activity datasets to processed activity datasets may be achieved by conventional software logic and that such logic may be a part of the app logic provided to the user computing device in the provisioning steps described above.

Deriving Representations from Processed Activity Datasets

To summarize the discussion so far, we used app logic to derive a dataset corresponding to a user's activity and, further, used the app logic to ascertain that it was confirmed (as per the specification) and possibly rated.

We now wish to share the confirmation and rating of the activity (event) with a service provider. However, the service provider may not trust the shared information. Moreover, the user may not wish to share the actual "raw" data pertaining to his activity.

One approach to solving this problem is as follows.

We derive a representation of the processed activity dataset and the specification constraints using the app logic provided by a service provider such that the representation may not be reverse engineered to obtain any of the original data from which it was derived. We may then share the derived representation with a service provider.

Further, we assume the service provider is equipped with tools that allow him to verify that 1) the representation was created by the app logic and 2) that the app logic itself has not been tampered with.

Thus, the service provider may trust the confirmation and rating of an event based on the tool that verify the working and integrity of the app logic itself.

We now describe the above approach in more detail.

To show the derivation of such irreversible representations we proceed by first describing relevant portions of prior art. In a related application (cf. U.S. application Ser. No. 15/475,748), which is hereby incorporated by reference in its entirety), techniques are described to convert a user's biometric datasets, such as fingerprint data or facial features dataset, into cryptographic representations that are computationally irreversible. We summarize the relevant technology as follows.

We assume the existence of three engines KGE (Key Generating Engine), PGE (Proof Generating Engine) and PVE (Proof Verifying Engine). As is known in prior art, each of these engines may be implemented on one or more computing devices executing special software logic. A convenient way of describing the functioning of the various engines is to treat them as shown in FIGS. 5A, 5B, 5C and 5D, respectively.

KGE (111, cf. FIG. 5A) accepts as input a computer program (service logic L, 100) and a dataset 200 and constraints (e.g., the user's activity dataset FIG. 2D and the associated constraints FIG. 2E). It produces two cryptographic keys, PK 300 and VK 400 called the proving key and the verifying key, respectively. It also produces a representation (R1) 500 based on the input dataset and "L" 200.

The logic "L" supplied as input to KGE performs the exemplary functions ascribed to the custom logic described above. That is, "L" processes an activity dataset (e.g., FIG. 2D) with respect to a set of constraints (e.g., FIG. 2E) to check confirmation or disconfirmation. KGE proceeds with the generation of the keys PK and VK and the representation R1 in the case of confirmation, otherwise it produces a failure indication.

The term "cryptographic key" refers to digital data objects that satisfy the following properties.
(C1) The data comprising the keys, if rendered on a display device, appears as a random sequence of binary (hexadecimal) digits.
(C2) No two distinct input objects will produce the same output keys.
(C3) An input object always produces the same output key every time, if it has not been altered in any way.

PGE (222, FIG. 5B) accepts the representation R1 500 (produced by KGE as an output) and the proving key PK 300 (also produced by KGE) and produces a cryptographic object called the proof, P (555) and a new representation R2 550 that is a function of the input R1 500 and of PK. The object "P 555" satisfies the property that, if displayed, it appears as a random collection of (hexadecimal) digits.

Figure 5A:
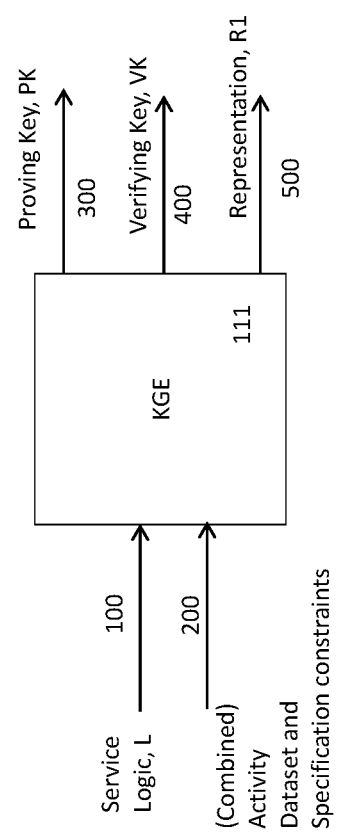
FIG. 5A shows the operation of the key generating engine (KGE).
Figure 5B:
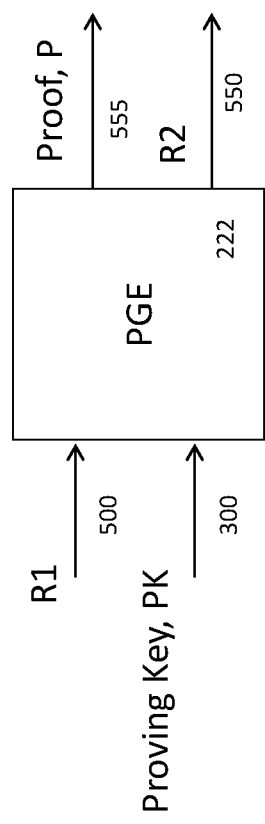
FIG. 5B shows the operation of proof generating engine (PGE).

PVE (333, FIG. 5C) accepts as input a verifying key, VK (400), produced by the KGE, a proof object P (555) produced by the PGE, and representation R2 (550) and outputs either "true" or "false". It produces the response "true" if and only if all the following conditions are true; otherwise it produces the response "false".

the dataset 550 is produced by PGE 222 L2 (cf. FIG. 5B);
the key VK is produced by KGE;
the proof object P (555) is produced as output by PGE 222 (cf. FIG. 5B).

Figure 5C:
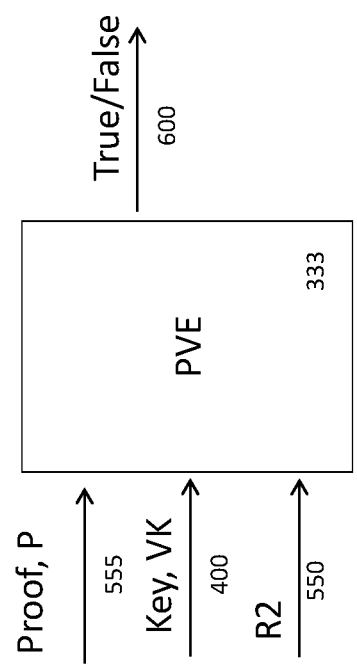
FIG. 5C shows the operation of proof verifying engine (PVE).
Figure 5D:
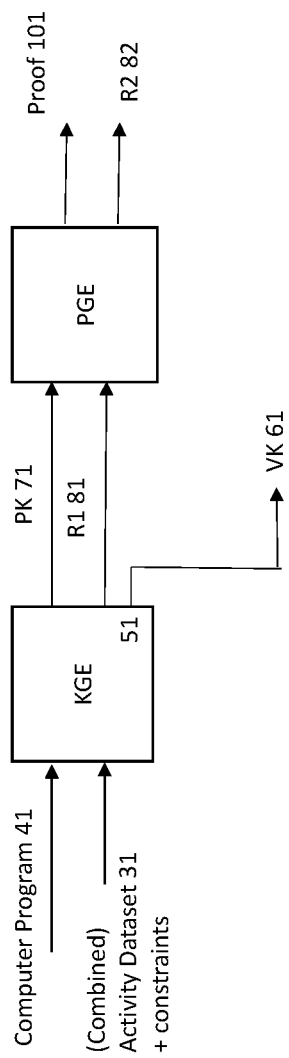
FIG. 5D shows the combined operation of KGE and PGE.

That is, as shown in FIG. 5D, the use of KGE and PGE are to be viewed as a sequence of inter-connected operations. A computer program (equivalently, service or software logic) 41 and user activity dataset 31 are fed as input to KGE 51 that produces representation R1 81, PK 71 and VK 61 as output. PK 71 and R1 81 are fed as input to PGE 91. PGE 91 produces a proof object 101 and representation R2 82.

Note that engines KGE and PGE may be freely available from one or more service providers as special software packages that can be downloaded and run on general purpose computers, computing devices, smart devices, etc. These software packages may or may not be a part of the activity confirmation app discussed above. We now show and discuss enabling examples of constructing and using KGE, PGE and PVE.

The functioning of the engine KGE may now be explained by analogy with reference to FIGS. 6A, 6B and 6C as follows where for ease of explanation, we have reduced the 8×8 processed activity matrix of FIG. 4C to an exemplary 3×3 matrix.

FIG. 6A shows the exemplary dataset for the activity dataset of a user as a 3×3 matrix (and the associated constraints stated in the specification). The cells of the matrix are numbered one through nine using roman numerals (i, ii, etc.); the cell values are shown as integers 37, 42, etc. In FIG. 6B we map each cell value and its position as a pair to one of the integers 1, 2 or 3 as shown. The pairs represent the cell number and the cell value, thus (i,37) means the sample value 37 in cell "i" of the matrix, etc.

We now construct a 3×3 Sudoku Puzzle (or Latin Square) using the integers 1, 2 and 3. One such arrangement is shown in FIG. 6C. As is well-known, Sudoku puzzles satisfy the constraint that the sum of each row and column is equal. (In the example shown in FIG. 6C, the cell values of each row and column add up to 6.)

Whereas the Sudoku Puzzle was chosen to be of order (i.e., dimensions) 3×3 and the input dataset was also assumed to be a matrix of order 3×3, this is merely exemplary. Generally, the orders of the processed activity matrix and the Sudoku puzzle will be the same or chosen as per system designers, e.g., based on considerations related to enforcing cryptographic security.

Whereas we have used Sudoku puzzles for illustrative purposes, it may be noted that any non-deterministic polynomial complete (NP-complete) problem may be used as is known in prior art, such as Boolean satisfiability, three-coloring of a graph, etc.

It is to be noted that knowledge of the Sudoku arrangement of FIG. 6C cannot be used to derive the matrix of FIG. 6A without possessing the data of FIG. 6B. That is, going from FIG. 6A to FIG. 6C via FIG. 6B is clear but reversing, i.e., deriving FIG. 6A from FIG. 6C—without knowledge of FIG. 6B—is computationally intractable. As will be explained later in the current application, the data represented by FIGS. 6A and 6B will always be stored in the user computing device and not transmitted to any other entity. Embodiments of the present invention will use the dataset represented by instances of the dataset shown in FIG. 6C. In this manner, the private data of the user is always kept in the user computing device and, as such, is private.

Thus, the functioning of KGE may be described as a software program (engine) that takes an activity dataset (and associated specification constraints) and another computer program L as input. KGE processes the input dataset and input constraints (as described above, e.g., FIG. 2F), and if the activity dataset can be confirmed with respect to the specification constraints, it produces the mapping (such as shown in FIG. 6B) and from it produces a Sudoku Puzzle with the Sudoku constraints, such as shown in FIG. 6C in the clear. If the activity dataset is disconfirmed as per the specifications, KGE produces a failure indication.

In one embodiment, the input dataset to KGE may be formatted in a pre-determined manner to make it amenable for processing by the logic L.

Additionally, the engine KGE produces an encryption key representing the computer program "L" and a corresponding decryption key (FIG. 6D). Prior art describes how encryption and decryption keys may be produced. We refer to the two keys as the proving and verifying keys, respectively. Note, that the encryption and decryption keys may be used to detect any changes to the logic "L" as is known in prior art.

Now we describe an enabling example of PGE with the help of FIG. 7A.

Taking the output dataset of FIG. 6C, we split it into two parts shown as FIGS. 7A and 7B. Clearly, the two parts may be combined to yield the original dataset of FIG. 6C. However, consider a Sudoku Puzzle with missing values (i.e., given a Sudoku Puzzle with blank values, find a solution). It is known in prior art that "solving" a Sudoku problem is "hard" for computer programs. (The statement holds for all NP-complete problems.) For example, it has been estimated that a 9×9 Sudoku puzzle has tens of trillions of possible solutions (6,670,903,752,021,072,936,960). The term "hard" is well-known in computer science as characterizing problems that are difficult to solve using computers because of the enormous number of possibilities (combinations) that need to be tried.

Thus, PGE may be described as an engine that takes as input a completed Sudoku, such as shown in FIG. 6C and a proving (encryption) key and produces as output two (split) pieces of the input Sudoku (as shown in FIGS. 7A and 7B. Furthermore, PGE encapsulates one of the two split pieces along with the Sudoku constraints, viz., the sum of each row and column must be equal, in an encrypted object (using the encryption key) called the "proof" and the second split piece of the Sudoku in the clear as a dataset "R2". Thus, FIG. 7A is the proof and FIG. 7B is the output dataset "R2" of PGE.

Now we describe an enabling example of PVE with the help of FIG. 8 as follows.

Given the decryption (verifying) key as input and the "proof" object of FIG. 7A, we can produce a decrypted version of the proof, FIG. 8 step 1, and combine it with the input dataset shown in FIG. 7B to obtain a final dataset. Using the Sudoku constraints contained in the decrypted "proof" object (step 1), we may verify that the final dataset satisfies the Sudoku constraints or not. In the former case, PVE returns "true" and in the latter, it returns "false".

Thus, the working of PVE may be explained as an engine that takes as input a decryption (verifying) key, a proof object representing one encrypted piece of the Sudoku puzzle and its constraints, and a corresponding second piece of the Sudoku Puzzle In the clear). The engine combines the two pieces of the Sudoku Puzzle and verifies its correctness with respect to the (decrypted) constraints in the proof object. If the constraints are satisfied, PVE outputs "true"; else it outputs "false".

It is important to note the meaning being ascribed to "true" and "false" values as returned by the PVE. The return value of "true" signifies that the "proof 101, verifying key 61, and dataset 82" have been produced by the KGE and PGE as shown in FIG. 5D. That is, a "true" value asserts the relationship between these objects as per FIG. 5D. A return value of "false" shows that the relationship between the three objects cannot be asserted.

It is important to note that the R1, PK and VK produced by the KGE are a function of the input dataset and the input software logic. Any changes to either the software logic or the input dataset engenders a different PK, VK and R1 to be produced. Furthermore, the complementarity of PK and VK is also bound to the input software logic by the KGE (and bound to the proof object P1 by PGE).

Since the encryption and decryption keys are bound to the logic "L" by the KGE, it is always possible to check that the logic "L" has not been modified in any manner since any change to "L" whatsoever will break the complementarity of the two keys.

The complementarity relationship may be verified by re-running PGE (cf. FIG. 5B) on the input dataset R1 (500), obtaining a new proof P2 and new dataset R2' and using the (previous) VK 61, new proof P2 and new dataset R2' as input to PVE (cf. FIG. 5C). If PVE returns "true" then the complementarity between PK and VK can be asserted.

Returning now to the description of creating (irreversible) representations from the processed activity dataset of a user's activity, we propose the user computing device that is in possession of the user's processed activity dataset (obtained as described above) acquire the engine KGE and PGE from a service provider. (These may be a part of the previously supplied app logic.)

The user computing device may thus now be said to possess, inter alia, app logic including the component, L.

The activity dataset and app logic L are provided as input to KGE that produces a proving key PK, a verifying key VK and a new representation R1 (as a function of the input (processed) activity dataset and the logic L), cf. FIGS. 6A, 6B, 6C and 6C.

Note that the representation R1 corresponds to the completed Sudoku Puzzle as in FIG. 6C.

Next, we input R1 and PK to the PGE that generates a proof object P and a new dataset R2 that is a function of the input dataset R1. Note that PGE splits the input dataset R1 into two components. It inserts cone component into the (encrypted) proof object and the second component is outputted as the dataset R2 (in the clear), cf. FIGS. 7A and 7B.

The user device now possesses the user's processed dataset, the proof object P, the proving key PK, the representation R2 and the verifying key, VK. It may transmit the proof P to the service provider.

Note that the proof P is an encrypted object that contains a "split" piece of the Sudoku puzzle. The latter corresponds to the "second" piece of the puzzle that was derived from the input R1 (500, cf. FIG. 5B).

Note, that the computational intractability of the Sudoku Puzzle and that of breaking the encryption key, implies that when we split a Sudoku Puzzle into two pieces and distribute them to different entities, we are relying on the fact that any entity that comes into possession of one piece of the Puzzle will require enormous computational power to "solve" the problem, i.e., compute the missing piece; whereas, an entity that has the decryption key and the two pieces of the puzzle may combine them with a relatively small computational effort.

In case the user computing device wishes to request a third party to confirm (and possibly rate) his activity, it may present the VK and R2 in its possession to said entity which may then transmit the same to the service provider (again, the address of the service provider may be pre-determined in the activity logic), e.g., the provider that provisioned the user computing device with KGE, PGE and the activity logic.

The service provider receives R2 and VK from third party. It is reasonable to assume that since he provided KGE and PGE to the user computing device, he is in possession of the engine PVE.

Thus, the service provider may input R2, VK and the proof P (obtained earlier from the user computing device) to PVE that responds with true/false accordingly, cf. FIG. 8.

Implementation Considerations

Block-chain, Distributed service provider, confirmation agent, rating agent

In one embodiment of the present invention, a (distributed) database system is used to store the proof objects and the activity logic. One or more applications may be defined to respond to requests for various kinds of activity logics and the corresponding KGE and PGE software libraries.

In an embodiment of the present invention, a service provider provisions user computing devices with KGE, PGE and activity logic. It acts as a confirming agent as described above using the PVE library. It may also act as the rating agent.

In an alternative embodiment, a service provider provisions user computing devices with KGE, PGE and activity logics and provides PVE to a third party who acts as a confirming and rating agent.

In yet another embodiment, a service provider comprises sub-units responsible for provisioning user computing devices with KGE, PGE and activity logics, a sub-unit acting as a confirming agent and a sub-unit acting as a rating agent.

In an embodiment of the present invention, the distributed database is a block-chain ledger system operating under smart contracts. One or more smart contracts may act as the provisioning agent, the confirming agent and the rating agent.

Illustrative Embodiments

The present invention envisions any type of motion in a physical environment to be encapsulated by suitably designed activity logic designed to run on user computing devices.

Many types of activities may be so encapsulated. For example, a computer worker's actions of typing or data entry may be encapsulated as a transaction in which we may encapsulate the number of keystrokes per minute, or gestures on a touch sensitive device per minute, etc. In computer game playing programs one may encapsulate the number of attacks or kills, etc. In smart phones with camera sensors, we may encapsulate the number of photographs snapped in a certain time period or between two given geographic locations or the interval between receiving a first and second As another example, consider logic that relates to the activity of sleeping. In such a case, the activity may choose one or more attributes as confirmatory for said activity. For example, a rater may mandate the presence of data streams from a motion sensor and a proximity sensor (e.g., a user's smart phone may be required to be near his smart watch). We may thus use the attributes relating to the user's position, motion, proximity to his watch, and a $_7$-hour duration of activity to confirm a sleeping event with the confirming specification that the dataset be processed to verify that there was horizontal motion.

Activities may not necessarily relate to exercise only. Certain tasks and jobs may entail physical activities. For example, a person may be asked to remove snow from a driveway. Such activities may also be encapsulated as agreements, e.g., between the person performing the activity and the person paying for the activity. Again, in such a case, a service provider may specify the template, e.g., snow plowing, and further specify the confirmatory attributes, e.g., driveway must be cleared of snow. The worker clears the driveway, stakes a picture of the cleared driveway and signals to his user computing device that he is finished with the task.

Activity logic encapsulates the user's activity dataset and confirms it by ensuring that the driveway photograph is clear of snow. We pre-suppose the existence of software that recognizes features of roads and whether they have been plowed. Such image recognition software is becoming widely available.

A person may be hired to deliver goods to a number of (addressed) locations. A service provider may define a template encapsulating such an activity along with its associated confirmatory attributes, e.g., starting location, intermediate locations, ending locations, duration of activity, etc. Moreover, since the delivery schedule may often change, the delivery agent, i.e., the user, may be asked by the system to specify his itinerary before starting the activity. The system may then choose the confirmatory attributes according to its internally configured logic.

A consumer may choose to select his activity rather than select an activity proposed by a service provider. Consider for example a waiter in a restaurant that wishes to utilize an activity template related to his work, i.e., he wishes to encapsulate his work activity as a computable entity in the sense described above.

A service provider may provide a first activity template to such a user who may then launch the activity template. The user computing device running the activity template logic gathers data as the user performs his chosen activity. At the conclusion of the activity (signaled by the user to the logic of the activity template), the dataset collected by the latter is transmitted to the service provider who derives a second activity template that may be provided to the consumer.

Subsequently, the user may engage in activities that are processed by the user computing device running the logic associated with the second activity template. The latter, as described above, derives one or more representations from the activity dataset that may be confirmed and rated as events by third parties without compromising the privacy of the user's data.

Note, that in this case, the user shares his activity data with the service provider, in response to the first activity template. The user is only required to do so in this phase, which may be considered as a provisioning step. Datasets corresponding to subsequent activities (instances) may be processed entirely by the user computing device locally and only privacy-preserving representations corresponding to the subsequent activities may be transmitted and utilized by third parties.

Converting Rated Transactions into Coins

Once an activity has been rated, it may be converted into one or more virtual currencies. Prior art describes several mechanisms that allow conversion of one kind of a digital object into a virtual cryptocurrency. One example of such cryptocurrency that may be employed is Bitcoin. A user computing device may present representation R2 and verifying key VK to a currency conversion agent (computer program) that may then request the R2 and VK to be confirmed and rated by a third-party entity.

It is to be noted that since the confirming and rating process is cryptographic, the currency conversion agent is afforded cryptographic surety of the presented "credentials".

Agreements

In the discussion, so far, we have presented the idea of a user performing some activity and the activity being rewarded by a rating that may be converted into coinage. This process may be characterized as an agreement between a coinage provider and a recipient. In practical terms, we may consider an enterprise, such as a health insurance provider, who may enter an agreement with its customers so that the customers may engage in physical activity to improve their health, thus leading to lower health maintenance costs for the insurance provider.

Continuing with the above example, the insurance provider may supply the application logic that encapsulates the user's activity; the insurance company may then confirm, rate and convert the rated event into a virtual currency.

Alternatively, the application logic may be provided by one group of providers and the rating, etc., may be provided by the insurance company. This flexibility is made possible by the trust in the verification protocol.

Other Implementations

In the examples described above the software logic for confirming and possibly rating a user activity has been described as an app that can be downloaded, stored and executed in a user software device. It should be noted, however, that more generally this software logic may be provided in other forms. For instance, in some embodiments the software logic may be native software included with the user computing device. In particular, in some implementations the software logic may be directly incorporated into the operating system of the user computing device or other software that operates on the user computing device. Moreover, in some embodiments some or all of the logic for confirming and possibly rating a user activity may be implemented in hardware and/or firmware, or a combination of software, hardware and firmware.

The software logic provided by the service provider as described above is used to process the combined activity dataset of the user's activity. In particular, it is configured to process the dataset with respect to a set of specifications that determine whether the activity data supports a confirmation or disconfirmation of the underlying activity (or event). The software logic may be configured to consider one or more attributes and their values (or combinations thereof including statistical combinations and derivations of attribute values) in its determination of confirmation or disconfirmation.

Illustrative Computing Environment

Figure 9:
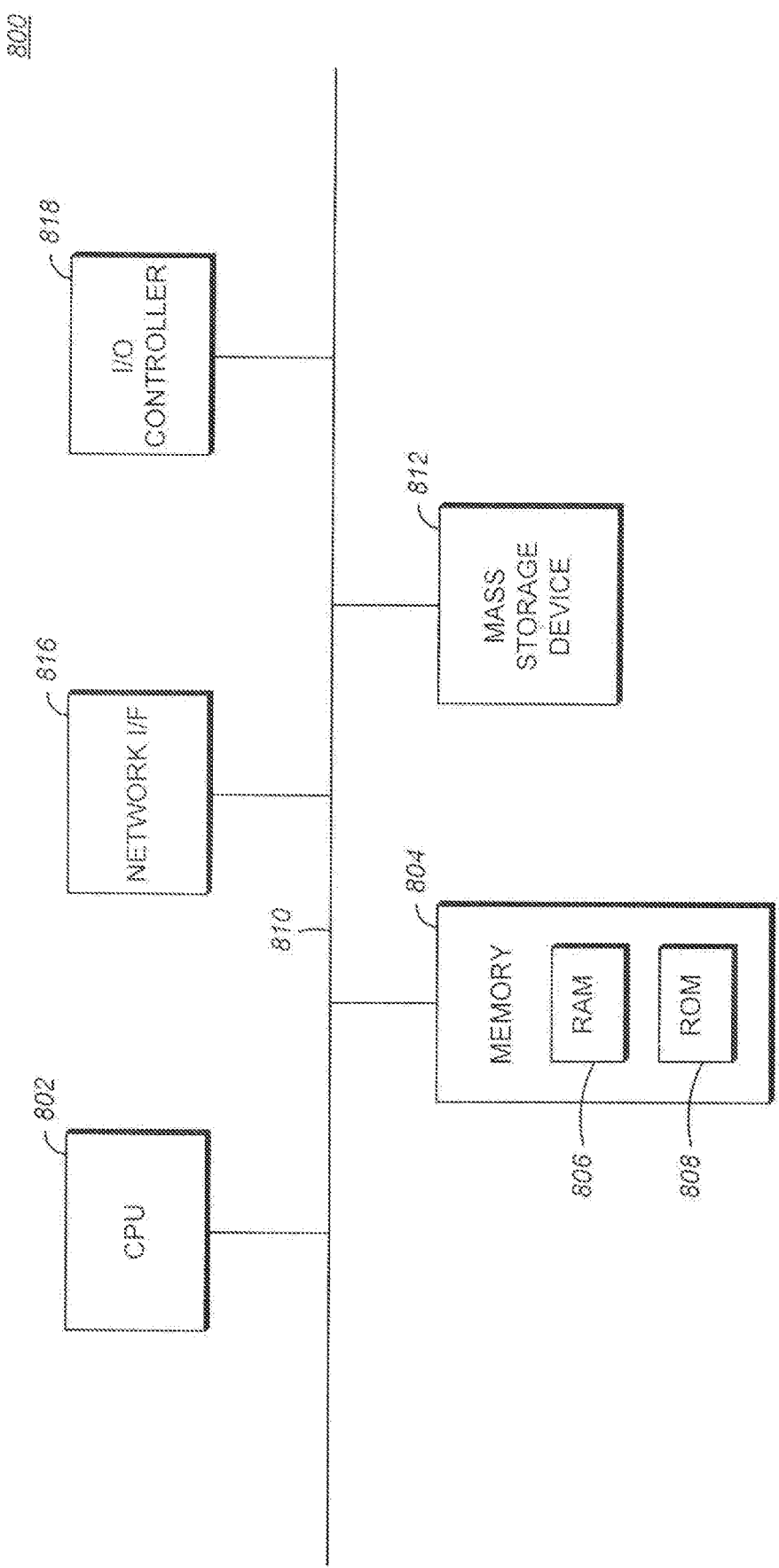
FIG. 9 shows an example architecture for a device such as the computing device or any of the servers or the like of the service provider described herein which are capable of implementing aspects of the subject matter described herein.

FIG. 9 shows an example architecture 800 for a device such as the computing device or any of the servers or the like of the service provider described herein which are capable of implementing aspects of the subject matter described herein. Thus, the architecture 800 illustrated in FIG. 9 shows an architecture that may be adapted for a server computer, server complex, mobile phone, a PDA, a smartphone, a desktop computer, a netbook computer, a tablet computer, GPS device, gaming console, and/or a laptop computer. The architecture 800 may be utilized to execute any aspect of the components presented herein.

The architecture 800 illustrated in FIG. 12 includes a CPU (Central Processing Unit) 802, a system memory 804, including a RAM 806 and a ROM 808, and a system bus 810 that couples the memory 804 to the CPU 802. A basic input/output system containing the basic routines that help to transfer information between elements within the architecture 800, such as during startup, is stored in the ROM 808. The architecture 800 further includes a mass storage device 812 for storing software code or other computer-executed code that is utilized to implement applications, the file system, and the operating system. For example, if the architecture 800 is used for the user computing device, mass storage device 812 may store software code for the app described herein which is used to confirm and possibly rate user activities, which may be executed by CPU 802.

The mass storage device 812 is connected to the CPU 802 through a mass storage controller (not shown) connected to the bus 810. The mass storage device 812 and its associated computer-readable storage media provide non-volatile storage for the architecture 800.

Although the description of computer-readable storage media contained herein refers to a mass storage device, such as a hard disk or CD-ROM drive, it should be appreciated by those skilled in the art that computer-readable storage media can be any available storage media that can be accessed by the architecture 800.

By way of example, and without limitation, computer-readable storage media may include volatile and non-volatile, removable and non-removable media implemented in any method or technology for storage of information such as computer-readable instructions, data structures, program modules, or other data. For example, computer-readable media includes, but is not limited to, RAM, ROM, EPROM (erasable programmable read only memory), EEPROM (electrically erasable programmable read only memory), Flash memory or other solid state memory technology, CD-ROM, DVDs, HD-DVD (High Definition DVD), Blu-ray, or other optical storage, magnetic cassettes, magnetic tape, magnetic disk storage or other magnetic storage devices, or any other medium which can be used to store the desired information and which can be accessed by the architecture 800.

According to various embodiments, the architecture 800 may operate in a networked environment using logical connections to remote computers through a network. The architecture 800 may connect to the network through a network interface unit 816 connected to the bus 810. It should be appreciated that the network interface unit 816 also may be utilized to connect to other types of networks and remote computer systems. The architecture 800 also may include an input/output controller 818 for receiving and processing input from a number of other devices, including a keyboard, mouse, or electronic stylus (not shown in FIG. 9). Similarly, the input/output controller 818 may provide output to a display screen, a printer, or other type of output device (also not shown in FIG. 9).

It should be appreciated that the software components described herein may, when loaded into the CPU 802 and executed, transform the CPU 802 and the overall architecture 800 from a general-purpose computing system into a special-purpose computing system customized to facilitate the functionality presented herein. The CPU 802 may be constructed from any number of transistors or other discrete circuit elements, which may individually or collectively assume any number of states. More specifically, the CPU 802 may operate as a finite-state machine, in response to executable instructions contained within the software modules disclosed herein. These computer-executable instructions may transform the CPU 802 by specifying how the CPU 802 transitions between states, thereby transforming the transistors or other discrete hardware elements constituting the CPU 802.

Encoding the software modules presented herein also may transform the physical structure of the computer-readable storage media presented herein. The specific transformation of physical structure may depend on various factors, in different implementations of this description. Examples of such factors may include, but are not limited to, the technology used to implement the computer-readable storage media, whether the computer-readable storage media is characterized as primary or secondary storage, and the like. For example, if the computer-readable storage media is implemented as semiconductor-based memory, the software disclosed herein may be encoded on the computer-readable storage media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable storage media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the architecture 800 in order to store and execute the software components presented herein. It is also contemplated that the architecture 800 may not include all of the components shown in FIG. 9, may include other components that are not explicitly shown in FIG. 9, or may utilize an architecture completely different from that shown in FIG. 9.

The above description of illustrated examples of the present invention is not intended to be exhaustive or limited to the precise forms disclosed. While specific embodiments of, and examples for, the invention are described herein for illustrative purposes, various equivalent modifications are possible without departing from the broader spirit and scope of the present invention.

These modifications can be made to examples of the invention in light of the above detailed description. The terms used in the following claims should not be construed to limit the invention to the specific embodiments disclosed in the specification and the claims. Rather, the scope is to be determined entirely by the following claims, which are to be construed in accordance with established doctrines of claim interpretation. The present specification and figures are accordingly to be regarded as illustrative rather than restrictive.

The invention claimed is:

1. A method for allowing third party authentication of confirmation of an activity performed by a user of a computing device, comprising:
   receiving, by the computing device, a first dataset of values for a plurality of attributes respectively obtained from a plurality of sensors associated with the computing device, the first dataset reflecting an activity of the user obtained over a first period of time during which the activity occurs;
   receiving, by the computing device, a second dataset of values for the plurality of attributes respectively obtained from the plurality of sensors that reflect the activity of the user obtained over a second period of time during which the activity occurs, the first dataset being a reference dataset to which the second dataset is to be compared;
   comparing, by the computing device, at least a subset of the attribute values in the first dataset to their corresponding attribute values in the second dataset to confirm whether at least the subset of attribute values in the second dataset matches the subset of attribute values in the first dataset to within a prescribed degree; and
   if the matching is confirmed, creating a representation of an indicia of the confirmation and deriving a set of cryptographic objects from the representation such that a third party is able to authenticate the confirmation of the matching without being able to derive the first or second datasets.

2. The method of claim 1 further comprising combining the first and second datasets into a single combined dataset if the matching is confirmed, the indicia of the confirmation being the single combined dataset.

3. The method of claim 1 further comprising assigning a rating to the matching of the second dataset to the first dataset.

4. The method of claim 3 wherein assigning the rating includes assigning a rating to the second dataset based on a measure reflective of the attribute values for at least one selected attribute in the second dataset when compared to a measure reflective of the attribute values for the at least one selected attribute in the first dataset.

5. The method of claim 4 wherein the measure reflective of the attribute values of the at least one selected attribute in the first and second datasets is a statistical measure.

6. The method of claim 5 wherein the statistical measure is an average value of the attribute values of the at least one selected attribute in each of the first and second datasets.

7. The method of claim 4 further comprising selecting said at least one selected attribute from among the plurality of attributes without communicating to the user which of the plurality of attributes are selected.

8. The method of claim 7 wherein the receiving and comparing are performed by an application that is executable at least in part on the computing device, the application including the predefined activity template.

9. The method of claim 3 further comprising providing the representation and the rating to a third party.

10. The method of claim 1 further comprising rendering a given one of the attributes values in the second dataset on a display associated with the computing device as the given attribute values in the second dataset are received.

11. The method of claim 10 further comprising rendering on the display a given one of the attribute values in the first dataset corresponding to the given attribute values in the second dataset that are rendered on the display.

12. The method of claim 1 wherein the activity of the user from which the first dataset of values is obtained is an activity that conforms to a predefined activity template that includes instructions specifying how the activity is to be performed.

13. The method of claim 1 further comprising receiving from the third party, in response to providing the representation and the rating, units of cryptocurrency in an amount based on the rating.

14. The method of claim 13 wherein the cryptocurrency is Bitcoin.

15. The method of claim 1 further comprising storing the first and second datasets of transactions in a blockchain system.

* * * * *